Patented July 3, 1945

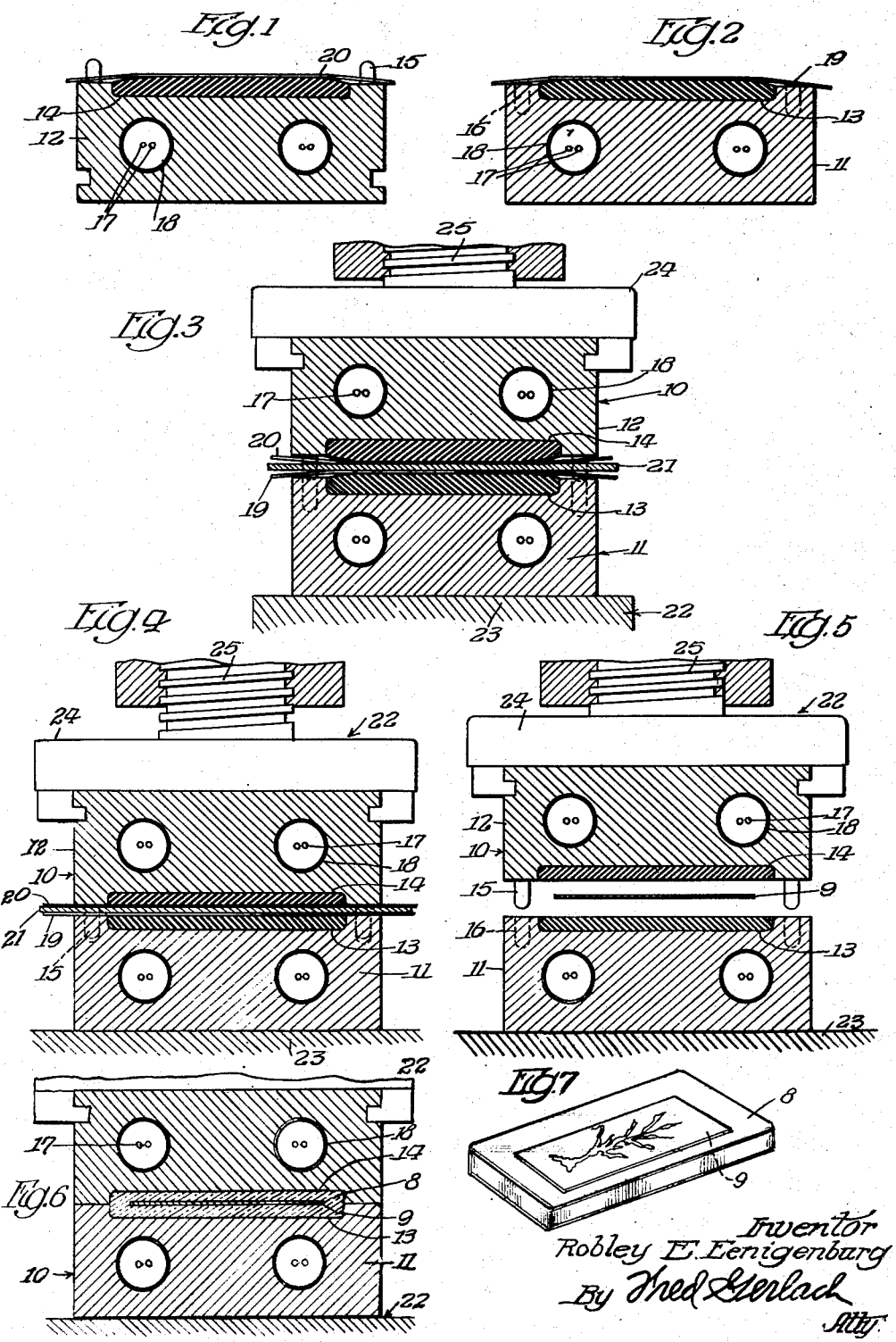
July 3, 1945.  R. E. EENIGENBURG  2,379,793
METHOD OF MANUFACTURING TRANSPARENT BODIES
WITH ITEMS EMBEDDED THEREIN
Filed Jan. 8, 1943
Inventor
Robley E. Eenigenburg
By Fred Gerlach
Atty.

2,379,793

UNITED STATES PATENT OFFICE 2,379,793

METHOD OF MANUFACTURING TRANSPARENT BODIES WITH ITEMS EMBEDDED THEREIN

Robley E. Eenigenburg, Chicago, Ill., assignor of one-half to Elmo F. Brennom, Chicago, Ill.

Application January 8, 1943, Serial No. 471,701

2 Claims. (Cl. 18—59)

The present invention relates to the manufacture of that type of article which comprises a solid, transparent body having embedded therein a picture, printed matter, or any like item.

The primary object of the invention is to provide a method of manufacturing an article of the aforementioned type which contemplates forming the body of material that is capable of solidifying and becoming transparent under pressure and heat, such, for example, as acrylic resin, and embedding the item in the material prior to processing of the latter to the end that the item, after processing of the material, will be permanently preserved in a fluid-tight manner.

Another object of the invention is to provide a manufacturing method of the last mentioned character which is essentially simple, may be carried out at a low cost, and involves the use of a two-piece mold, the pieces of which have complemental, opposed and communicating cavities therein.

Other objects of the invention and the various advantages and characteristics of the present manufacturing method will be apparent from a consideration of the following detailed description.

The invention consists in the several novel features which are hereinafter set forth and are more particularly defined by claims at the conclusion hereof.

In the drawing which accompanies and forms a part of this specification or disclosure and in which like numerals of reference denote corresponding parts throughout the several views:

Figure 1 is a section showing one of the mold pieces after the cavity therein has been filled with a mass of body forming material preparatory to compressing thereof;

Figure 2 is a similar section of the other mold piece;

Figure 3 is a section showing the two mold pieces after they have been placed in juxtaposition with a separator medium therebetween;

Figure 4 is a section showing the mold pieces being subjected to clamping pressure in order to level off the masses of body forming material in the mold cavities and place such masses under pressure;

Figure 5 is a section showing the mold pieces in separated relation and after removal of the separating medium and with the item to be embedded in the finished transparent body in position between the initially compressed masses of body forming material in the mold cavities;

Figure 6 is a section showing the mold pieces in clamped relation and also being subjected to heat with a view of solidifying, uniting and rendering transparent the masses of body forming material in the mold cavities and thus completing the article; and Figure 7 is a perspective of the finished article, i. e., the article resulting from the improved manufacturing method.

The present method contemplates the production or manufacture of an article, such, for example, as that shown in Figure 7 of the drawing. Such article comprises a solid, rigid, transparent body 8 having embedded therein an item 9, such as a picture or sheet of printed matter. The body 8 is rectangular and is materially wider, longer and thicker than the item 9. It is formed of any conventional resinous material that solidifies and becomes transparent under heat and pressure, such, for example, as acrylic resin. The item 9 is rectangular and is disposed midway between the top and bottom faces of the body and so that the edges thereof are spaced from the adjacent margins of the body.

A two-piece mold 10 is employed in carrying out the method. This mold consists of a bottom mold piece 11 and a top mold piece 12. The bottom mold piece has in the upper face thereof a cavity 13 and the top mold piece 12 has in the bottom face thereof a cavity 14. The top mold piece 12 is adapted to rest on the bottom mold piece 11 in connection with a molding operation. It is removable from the bottom piece in order to provide access to the cavities 13 and 14. Such cavities are complemental and register with one another when the two mold pieces are in juxtaposition. The top mold piece 12 has depending pins 15 and these are adapted to fit within vertically extending sockets 16 in the upper portion of the bottom mold piece 11 and to coact with said sockets in such manner as to retain the top and bottom mold pieces in proper alignment and against relative lateral displacement when they are in their molding position. Heating elements 17 are disposed in sockets 18 in the central portions of the two mold pieces and serve when energized by the supply of electrical current thereto to heat the mold.

In carrying out the improved method the cavities in the two mold pieces are filled with unprocessed acrylic resin in plastic form. Each cavity is over filled in order that the depth of the resin is greater than that of the cavity (see Figures 1 and 2). After over filling the mold cavities a sheet 19 of Cellophane or any other material to which unprocessed acrylic resin will not adhere, is placed over the top face of the bottom mold piece 11 and a sheet 20 of like material is placed across the mass of acrylic resin in the cavity 14 in the top mold piece 12. Thereafter a stiff metallic plate 21 is placed on the sheet 19 and the two mold pieces are brought into juxtaposition, as shown in Figure 3. Directly after the two mold pieces are brought together the mold is placed in a clamp 22 and is subjected to such clamping pressure that the two mold pieces are forced together (see Figure 4). In connection with the clamping operation the masses of acrylic resin in the mold cavities are compressed to a point where they are level with the faces of the mold pieces wherein the cavities are formed. Any suitable clamp or clamping device may be employed. The clamp 22 comprises a stationary clamp member 23 for supporting the bottom mold piece 11, and a vertically movable clamp member 24. The latter overlies the stationary clamp member 23 and is adapted, in connection with a mold clamping operation, to be urged downwards by way of a screw 25 which forms part of the clamp 22. After compressing and levelling off the masses of acrylic resin in the cavities 13 and 14 by clamping the two mold pieces 11 and 12 together by way of the clamp 22 the clamp is released by raising the vertically movable clamp member 24. Thereafter the top mold piece 12 is removed from the bottom mold piece 11. After removal of the top mold piece from the bottom mold piece the metalic plate 21 and the sheet 19 are lifted from the top face of the bottom mold piece 11 and the sheet 20 is removed from the top mold piece 12. At the conclusion of this operation the item 9 is centrally positioned on the top surface of the mass of unprocessed or partially processed acrylic resin in the cavity 13 of the bottom mold piece 11. Thereafter the top mold piece 12 is returned to its operative position wherein it and the bottom mold piece are in juxtaposition (see Figure 6). As soon as the two mold pieces are in their operative position they are again placed under clamping pressure by the clamp 22 and are heated by supplying current to the electric heating elements 17. During the clamping and heating operations the masses of acrylic resin in the mold cavities solidify, unite into a unitary structure or body and become transparent. When the material which is utilized to form the body of the article is acrylic resin the materials in the mold cavities is heated at a temperature of approximately 212° F. for a period of thirty minutes. At the conclusion of the heating operation the top mold piece 12 is released and removed so as to expose the finished article comprising the transparent body 8 having the item 9 embedded therein. By reason of the fact that the abutting marginal portions of the two masses of acrylic resin in the mold cavities become permanently united during the final step of the method the body 8 is essentially of one-piece or unitary design and the item 9 is sealed within the body in an air-tight manner and hence is effectively and efficiently preserved by the body.

The herein described method is essentially a simple one and may be carried out at a low cost. By changing the size or shape of the complemental cavities in the two mold pieces different shaped articles may be produced. The article which is produced by the present method is permanent. In addition it is characterized by the fact that the item within the unitary transparent body is sealed against air or moisture and hence is efficiently preserved. By forming the body 8 of acrylic resin or like material the item 9 in the finished article has, when viewed, the tendency to be magnified or illuminated. If desired the cavity in the bottom mold piece 11 may be charged in connection with carrying out of the method, with unprocessed acrylic resin or like material having a coloring pigment therein so that the bottom half of the body forming material is colored as distinguished from truly transparent. If the mold cavities are filled in this manner the mold pieces are separated after compressing of the masses of material in the cavities and then, after removal of the separating medium, the item 9 is inserted into place and the mold pieces are clamped together and subjected to heat for complete processing of the material.

The invention is not to be understood as restricted to the precise steps or details set forth since these may be changed or modified within the scope of the appended claims without departing from the spirit and scope of the invention.

Having thus described the invention what I claim as new and desire to secure by Letters Patent is:

1. That improvement in the manufacture of an article in the form of a one-piece transparent body with an item embedded therein, which comprises taking a pair of mold pieces having complemental open faced cavities therein and over filling each of the cavities with a plastic mass of material that is capable of solidifying and becoming transparent in the presence of pressure and heat, then interposing between the cavity equipped faces of the mold pieces a rigid plate and bringing the pieces while unheated into clamped relation with the plate so as to compress and level off the material in the cavities, then separating the mold pieces and removing the plate, then placing the item on the levelled off face portion of the material in one of the cavities, and finally again clamping the mold pieces together with the cavities facing one another and applying heat to said pieces so as to solidify, unite, and render transparent the material in the two cavities.

2. That improvement in the manufacture of an article in the form of a one-piece transparent body with an item embedded and fully confined therein, which comprises taking a pair of mold pieces having complemental open faced cavities therein and over filling each of the cavities with a mass of unprocessed material in plastic form and of the type that is capable of solidifying and becoming transparent upon the application of pressure and heat, then interposing between the cavity equipped faces of the mold pieces a rigid plate having against the sides thereof thin sheets of a substance to which the material will not adhere, then bringing the mold pieces while unheated into clamped relation with the plate and sheets so as to compress and level off the material in the cavities, then separating the mold pieces and removing the plate and sheets, then placing the item on the levelled off face portion of the material in or  of the cavities in such manner that the item's edges are disposed inwards of the edges of said levelled off face portion, and finally again clamping the mold pieces together with the cavities facing one another and applying heat to said pieces so as to solidify, unite, and render transparent the material in the two cavities.

ROBLEY E. EENIGENBURG.